United States Patent
Lockhart

(10) Patent No.: US 9,317,175 B1
(45) Date of Patent: Apr. 19, 2016

(54) INTEGRATION OF AN INDEPENDENT THREE-DIMENSIONAL RENDERING ENGINE

(71) Applicant: Amazon Technologies, Inc., Reno, NV (US)

(72) Inventor: Christopher Wayne Lockhart, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 256 days.

(21) Appl. No.: 14/035,914

(22) Filed: Sep. 24, 2013

(51) Int. Cl.
*G06T 15/00* (2011.01)
*G06F 3/01* (2006.01)
*G06F 3/0481* (2013.01)

(52) U.S. Cl.
CPC ............ *G06F 3/04815* (2013.01); *G06F 3/012* (2013.01); *G06F 3/013* (2013.01); *G06T 15/00* (2013.01)

(58) Field of Classification Search
None
See application file for complete search history.

(56) References Cited

U.S. PATENT DOCUMENTS

| | | | |
|---|---|---|---|
| 6,388,668 B1 * | 5/2002 | Elliott | 345/474 |
| 6,522,787 B1 * | 2/2003 | Kumar et al. | 382/268 |
| 2006/0085764 A1 * | 4/2006 | Klementiev | 715/853 |
| 2012/0036433 A1 * | 2/2012 | Zimmer et al. | 715/702 |

OTHER PUBLICATIONS

MSDN-.NET (".NET Development", Mar. 2013, https://web.archive.org/web/20130306150418/http://msdn.microsoft.com/en-us/library/ff361664(v=vs.110).aspx, Microsoft).*
MSDN, "Independent Composition: Rendering and Compositing in Internet Explorer 10", Jun. 2013, https://web.archive.org/web/20130601161040/http://msdn.microsoft.com/en-us/library/jj680148(v=vs.85).aspx, Microsoft).*
Jiménez et al, "ACD—A common OpenGL and Direct3D driver for the Attila GPU", Feb. 22, 2010.*

* cited by examiner

*Primary Examiner* — Carlos Perromat
*Assistant Examiner* — Xin Sheng
(74) *Attorney, Agent, or Firm* — Seyfarth Shaw LLP; Ilan N. Barzilay; Cyrus A. Miller

(57) ABSTRACT

Systems and approaches provide for a user interface (UI) that is based on the position of a user's head with respect to a computing device. In particular, a three-dimensional (3D) rendering engine that is independent of a particular operating system can be integrated with the UI framework of the operating system such that a window or view into a fully 3D world can be drawn using the independent renderer. This window or view can then be laid out and manipulated in a manner similar to other elements of the UI framework. Further, the 3D window or view can be configured to monitor head tracking data as input events to the UI framework. The contents of the window or view can be redrawn or rendered based on the head tracking data to simulate three-dimensionality of the content.

20 Claims, 10 Drawing Sheets

INTEGRATION OF AN INDEPENDENT THREE-DIMENSIONAL RENDERING ENGINE

BACKGROUND

As computing devices, such as laptops, tablets, and smartphones, become increasingly sophisticated, new and interesting approaches have arisen for enabling a computing device to convey information to a user and vice versa. For instance, a graphical user interface (GUI) incorporating windows, icons, and menus can be an advancement over a command-line interface by simplifying how a user operates an underlying software application. A user can cause the underlying application to perform a desired function without having to memorize a command or its syntax and manually typing in the command. As another example, a touch-based interface can be an improvement over an interface that relies on a directional keypad (e.g., up, down, left, right) by giving users a more immediate and precise way of selecting a UI element. Further, a touch-based interface may provide a more intuitive manner of operating a computing device by enabling users to directly manipulate UI elements. As devices become more powerful and new techniques are developed for users to interact with computing devices, UIs can be further improved upon to provide a more compelling and user-friendly computing experience.

BRIEF DESCRIPTION OF THE DRAWINGS

Various embodiments in accordance with the present disclosure will be described with reference to the drawings, in which.

DETAILED DESCRIPTION

Figure 1A:
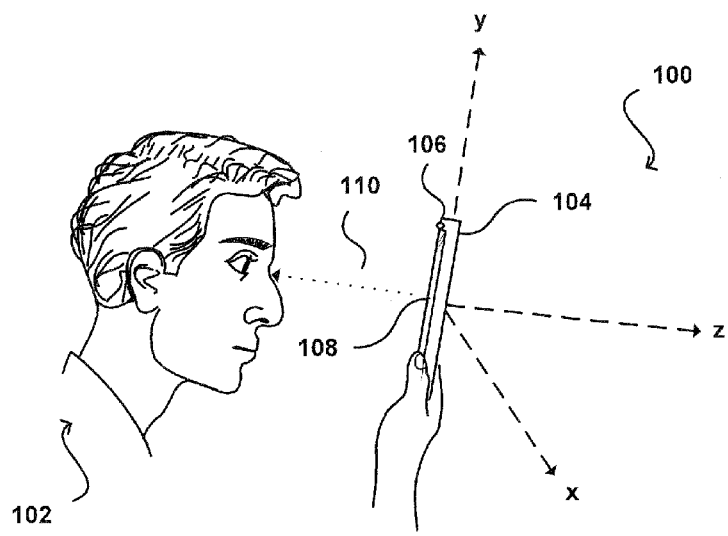
FIGS. 1A-1I illustrate an example approach for providing a user interface that is based on tracking of a head or face of a user in accordance with an embodiment.

In various embodiments, user interfaces that are based at least in part on a user's position with respect to a computing device and/or motion/orientation of the computing device are provided. One or more three-dimensional (3D) graphical elements may be presented on a two-dimensional (2D) display screen, or other display element. One or more processes can be used to determine a relative position, direction, and/or viewing angle of the user. For example, head or face tracking (or tracking of a facial feature, such as a user's eyebrows, eyes, nose, mouth, etc.) and/or related information (e.g., motion and/or orientation of the computing device) can be utilized to determine the relative position of the user, and information about the relative position can be used to render one or more of the 3D graphical elements to correspond to the user's relative position. Such a rendering can give the impression that the 3D graphical elements are fixed in space, and that the 3D graphical elements are arranged in 3D space. Conventional systems may only provide support for low-level 3D drawing and rendering. For example, the 3D capabilities for the Android® and iOS® platforms may be limited to Open Graphics Library (OpenGL®) or the version of OpenGL® optimized for mobile devices, OpenGL for Embedded Systems (OpenGL ES®) while Windows Phone® may be limited to Direct3D®. Users, however, may desire highly detailed 3D graphical elements that the conventional system's built-in 3D graphics library may be not be capable of drawing and/or may be inefficient in rendering. Further, a head-tracking based user interface may demand low latency and the conventional system's inherent 3D graphics subsystem may not provide the performance necessary for rendering 3D graphics in response to user and/or device motion.

In some embodiments, an independent 3D rendering engine that may have a broader set of features and/or better performance than the built-in or inherent 3D graphics capabilities of a conventional system can be utilized for drawing and rendering 3D graphics. For example, an independent 3D rendering engine may offer features such as support for 3D meshes/models and scenes not available for OpenGL® or Direct3D®, as well as perform rendering more efficiently than these built-in libraries. A conventional approach to provide an independent rendering engine to an operating system is to port the independent renderer to the operating system. While 3D content may then be drawn and rendered using the independent rendering library, such an approach may be not be closely integrated with the user interface framework of the operating system. For instance, this technique may be suitable for 3D games that are displayed in full screen mode and outside of the UI framework of the conventional system but users may prefer a more cohesive "look and feel" for other user applications and/or desire the full functionality of a user interface framework accompanied with highly detailed, complex 3D content.

Systems and methods in accordance with various embodiments of the present disclosure may overcome one or more of the aforementioned and other deficiencies experienced in providing content for display on a computing device. In particular, a 3D rendering engine or library that is independent of an operating system or platform can be integrated with a UI framework of the operating system to draw or render 3D content. In this way, 3D content can be generated using the independent renderer yet the UI elements containing 3D content rendered by the independent 3D rendering engine can behave and be manipulated like other user interface elements of the UI framework. In some embodiments, the UI elements containing the 3D content rendered by the independent renderer can be adapted to recognize user or device motion as input events for a computing device. For instance, a representation of a face or head of a user can be captured using a camera of the device and/or motion and orientation of the device can be estimated using a sensor or input element such as an accelerometer, gyroscope, and/or magnetometer. The computing device can use a position of the user in an image captured by the camera and/or the device motion and orientation data to determine a user's position with respect to the device (or related information such as the user's viewing angle). As the user moves his head and/or moves the device, the user's position with respect to the device may change. These changes in the user's relative position may be monitored by the computing device, and a change in relative position meeting determined thresholds can cause one or more 3D graphical elements to be redrawn or rendered, using the independent renderer, to correspond to the new relative position so as to enhance simulated three-dimensionality.

Various other functions and advantages are described and suggested below in accordance with the various embodiments.

FIGS. 1A-1I illustrate an approach for providing a user interface that is based on tracking of a head or face of a user in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alterative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

In this example, a vector 110 is shown from a point at the center of the display screen 108 to a point on the head of the user 102, such as between the user's eyes. Vector 110 is a three-dimensional vector that can be initially determined, for example, using a facial detection process performed on the image(s) captured by the camera 106. In other embodiments, the vector can be determined using sensors or other input devices of a computing system, such as accelerometers, gyroscopes, magnetometers, proximity sensors, among others. In at least some embodiments, vector 110 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, circle), contours (e.g., edges comprising the boundaries of the user's head or face), silhouettes (e.g., regions within the contours of the user's head or face), etc.

Figure 1B:
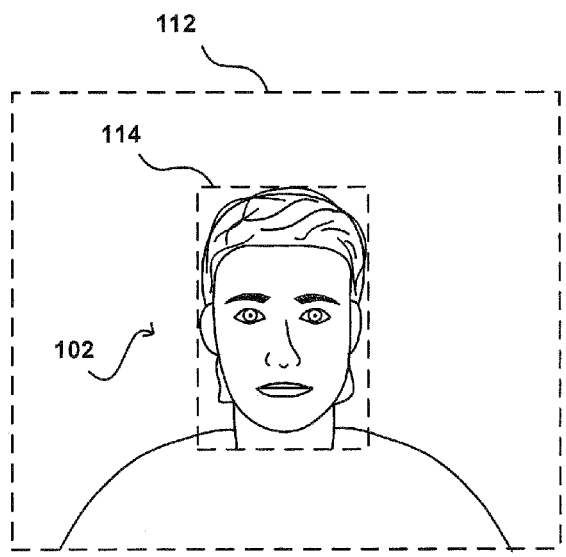
Figure 1C:
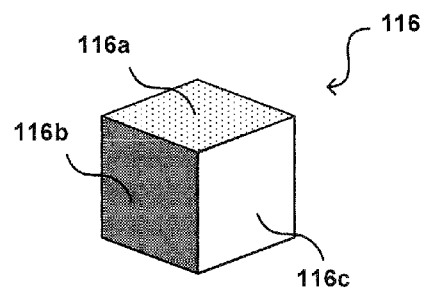
Figure 1D:
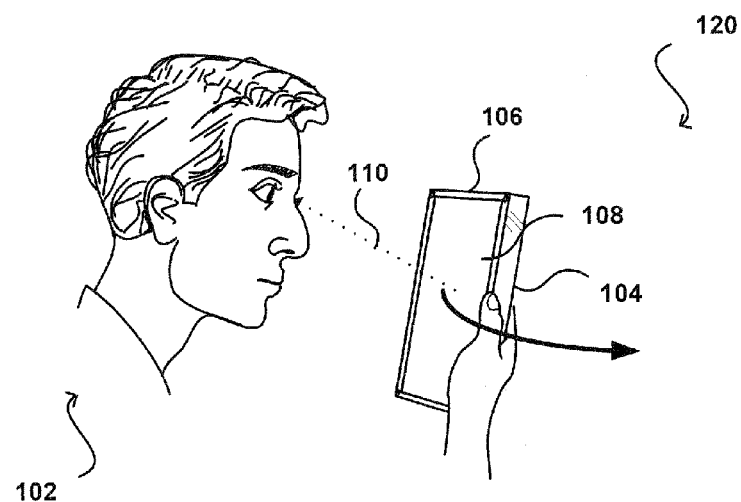
Figure 1E:
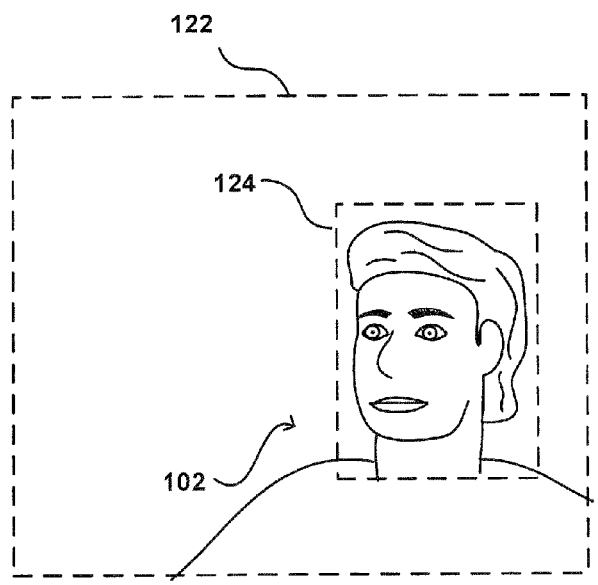
Figure 1F:
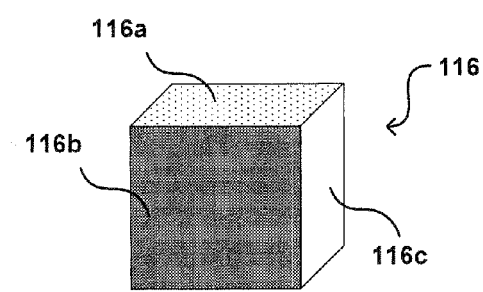

As illustrated in FIG. 1B, when the user 102 positions the computing device 104 in front of himself and gazes directly towards the display screen 108 such that the x-y plane of the device is perpendicular or substantially perpendicular to the user's line of sight (where the lateral axis corresponds to the x-axis, the longitudinal axis corresponds to the y-axis, and the depth of the device corresponds to the z-axis), the image data captured by the camera 106 of the device can include the image 112. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position or the viewing angle of the user with respect to a computing device. In this example, a user detection process is adapted for locating the head or face of a user in the image(s) captured by the camera 106. Here, the user detection process locates the head or face of the user 102 within the image 112 and provides as output the dimensions of a bounded box 114 indicating where the head or the face of the user is located in the image. In this example, the device is capable of rendering one or more three-dimensional graphical elements for display on the two-dimensional display screen 108 according to the position or viewing angle of the user with respect to the display screen. The device can rely on the position of the head or face of the user with respect to the device and/or the apparent motion of the user's head or face with respect to the device, as defined by vector 110, to render an appropriate perspective of a 3D object. FIG. 1C illustrates an example of a 3D box 116 with a top surface 116a, a left front-facing surface 116b, and right front-facing surface 116c that has been drawn based on the current position or viewing angle of the user with respect to the device as seen in FIGS. 1A and 1B. In this example, the front-facing surfaces 116b and 116c appear to be equal in scale when the user's line of sight is perpendicular or substantially perpendicular to the display screen 108.

in FIG. 1D, an example situation 120 illustrates that the user 102 has tilted the computing device 104 to the right with respect to the user, i.e., the user has rotated the device to his right along the longitudinal or y-axis, to obtain a second view or perspective of the 3D box 116, as depicted in FIG. 1F. As seen in FIG. 1E, the tilt or rotation of the device causes the camera to capture a different view or perspective of the user within image 122, here, a three-quarters profile of the head or face of the user facing leftward. The position of the user's face may also be shifted towards a right region of the image because of the rightward tilt or rotation of the device. In this example, the apparent motion of the face or head of the user (which may be primarily due to the motion of the device) can be tracked from the initial position detected in FIG. 1B to the new position depicted in FIG. 1E. For instance, the 3D vector 110 between the point between the user's eyes and the center of the front face of the device may be recalculated based on the new position and orientation of the user with respect to the computing device. Based on the apparent movement of the user's head or face, the 3D box can be redrawn rendered for display to correspond to the new perspective of the user 102. For example, as the user tilts the device rightward, the device will render and/or animate the 3D box 116 such that the left front-facing surface 116b of the cube appears more prominently on the display screen and the right front-facing surface 116c appears at a more oblique angle.

Figure 1G:
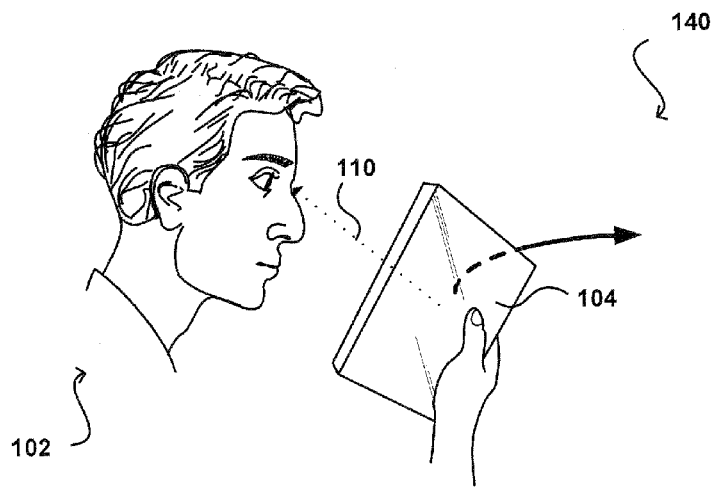
Figure 1H:
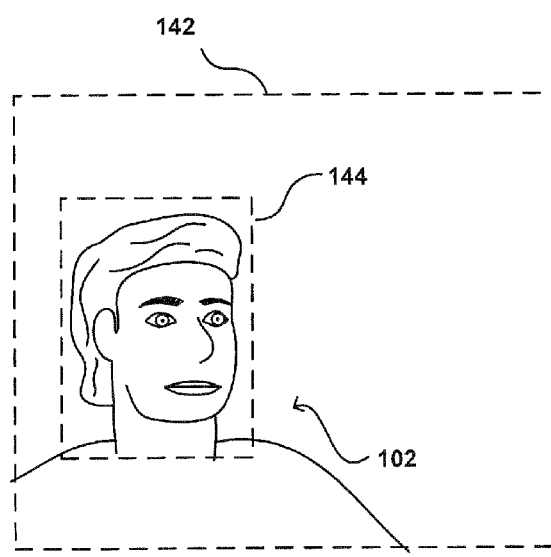
Figure 1I:
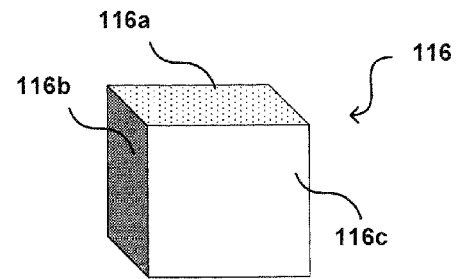

In FIG. 1G, an example situation 140 illustrates that the user 102 has tilted the computing device 104 to the left with respect to the user, i.e., the user has rotated the device to his left along the longitudinal or y-axis, to obtain a third view or perspective of the box. As seen in FIG. 1H, the tilt or rotation of the device causes the camera to capture a three-quarters profile of the head or face of the user facing rightward, and the position of the user's face has also shifted towards a left region of the image. In this example, the apparent movement of the face or head of the user (which, again, may be primarily due to the movement of the device) can be tracked from a previous position to the new position depicted in FIG. 1H. The 3D box 116 can be rendered for display based on the apparent motion of the user's head or face as seen in FIG. 1I. For example, if the user is initially positioned with respect to the computing device as seen in FIGS. 1D and 1E and the user tilts the device towards his left until the user is positioned with respect to the device as depicted in FIGS. 1A and 1B, the cube will transition or be animated from the perspective seen in FIG. 1F to the perspective seen in FIG. 1C. As the user continues rotating the device towards his left, the 3D box 116 may be animated or rendered from the perspective seen in FIG. 1C to the perspective seen in FIG. 1I wherein the right front-facing surface 116c of the cube 116 appears more prominently on the display screen and the left front-facing surface 116b appears at a more oblique angle.

It will be appreciated that when the user tilts the device forward (i.e., rotating the device along the x-axis such that the top portion of front of the device is further away from the user and the bottom portion of the front of the device is closer to the user), details of a bottom surface (not shown) of 3D box 116 may be displayed and the top surface 116a may be hidden. Likewise, tiling the device backwards (i.e., rotating the device along the x-axis such that the top portion of the front of the device is closer to the user and the bottom portion of the front of the device is further from the user), may cause the top surface 116a to be displayed more prominently and hide the bottom surface (not shown) of the box. It will be understood that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 116a and left front-facing surface 116b of the box may be displayed more prominently and the right front-facing surface 116c may be appear at a more oblique angle and the bottom surface may remain hidden. When the user tilts the device forward and towards his left (i.e., such that the bottom right corner of the device is the closest point of the device to the user), the bottom surface and right front-facing surface 116c can be displayed with more details, and the top surface 116a and left front-facing surface 116b may appear more obscured or hidden. Approaches for tracking a user's head or face to determine a position or viewing angle of the user with respect to the device are discussed in co-pending U.S. patent application Ser. No. 13/965, 126, entitled, "Robust User Detection and Tracking," filed Aug. 12, 2013, which is incorporated herein by reference.

Although a single 3D box is shown in the example of FIGS. 1A-1I, it will be appreciated that much more complex 3D graphical elements and backgrounds are used in various embodiments. Animating or rendering multiple, complex 3D graphical elements may exceed the 3D graphics capabilities of a conventional system that relies on a low-level 3D graphics library such as OpenGL® or Direct3D®, particularly for a user interface that is sensitive to latency such an interface based on head tracking. However, in accordance with various embodiments, integrating an independent 3D rendering engine with the system's UI framework can enable highly detailed 3D graphics to be drawn and rendered in response to head tracking data captured by a computing device. As used herein, a UI framework refers to a component of an operating system or platform enabling users to interact with a computing device running the operating system or platform, and includes approaches for the user to provide input to the computing device and for the computing device to provide output to the user. User input can include key or keyboard input, touch gestures or other pointer-based approaches (e.g., mouse, pointing stick, track pad), voice or other audio commands, visual gestures such as hand gestures or head gestures and movements, among other input techniques. Output provided by the computing device can include displaying text and/or graphics, audio, flashing of light-emitting diodes (LEDs) or other light sources, among other approaches for presenting data to a user. Examples of UI frameworks include the "View System" of the Android® operating system, the "UIKit" of the iOS® platform, the "Presentation Core" for the Windows Phone® platform, among others. As mentioned, a 3D rendering engine may be independent of an operating system when it is not incorporated or built into the operating system. For example, Android and iOS incorporate OpenGL® or OpenGL ES® and Windows Phone® incorporates Direct3D®. On the other hand, a separate 3D rendering engine, such as Open Graphics Rendering Engine (OGRE) 3D, Irrlicht Engine, OpenSceneGraph, Euclid, among others, can be characterized as independent of the operating system. A characteristic of an independent 3D renderer may be lack of integration with the UI framework of the operating system. For example, typical UI elements or views of the Android® platform can be rotated, translated, scaled, or faded (e.g., transparency effect). For example, Android® provides a Native Development Kit (NDK) to enable developers to port native code to a computing device operating the Android® platform, including porting an independent 3D rendering engine. However, such an approach may not be integrated with the UI framework as 3D content may be rendered full-screen, and the UI framework is disabled or otherwise unused. That is, a native window cannot be manipulated using the UI framework (e.g., rotated, translated, scaled, or faded) and cannot leverage the layout, measurement, optimizations, and other functionality provided by the UI framework.

Figure 2:
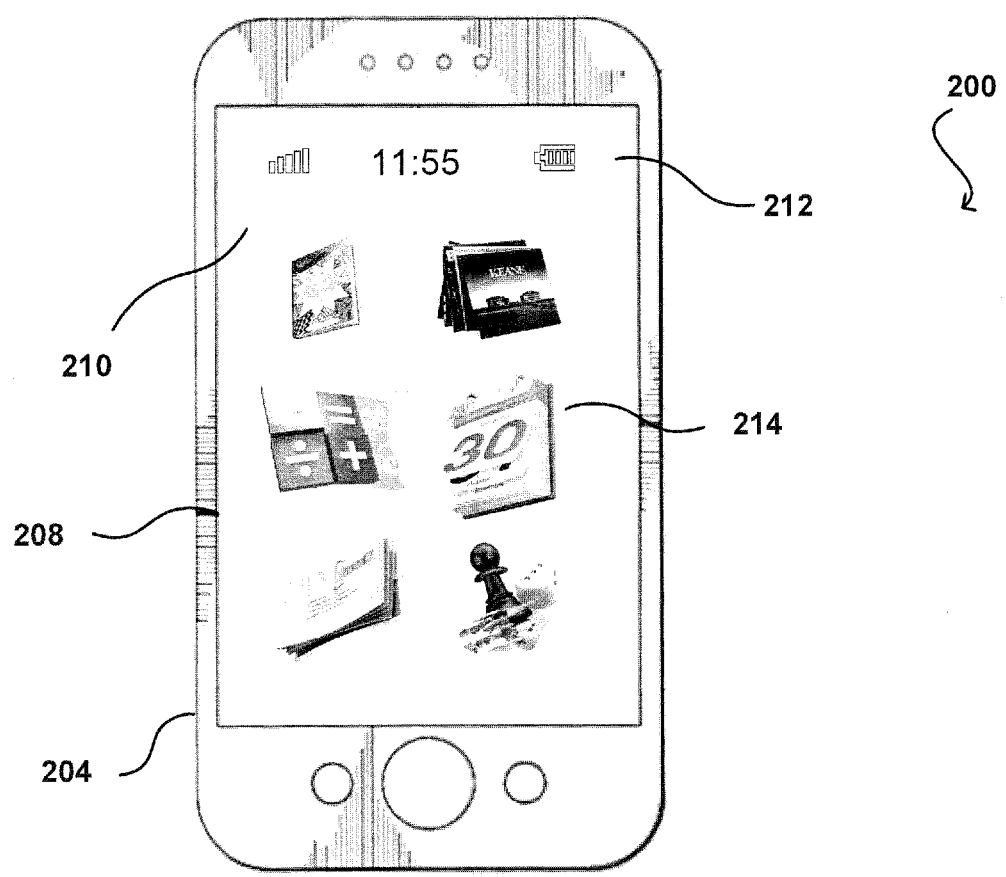
FIG. 2 illustrates an example of a user interface with a plurality of 3D graphical elements that can be used in accordance with an embodiment.

FIG. 2 illustrates an example 200 of a graphical user interface presented on a display screen 208 of a computing device 204. In this example, a user may be viewing a home screen application 210 that includes a status bar 212 indicating a state of a wireless network connection (e.g., cellular and/or Wi-Fi), a current time, and a state of battery life. The home screen application 210 may also include a plurality of highly detailed 3D icons 214 corresponding to various user applications, such as a notebook application, music library, calculator, calendar, email, game library, among others. The icons 214 reside within a UI framework of an operating system running on the device but are drawn using an independent 3D rendering engine, such as OGRE 3D, Irrlicht Engine, OpenSceneGraph, among others, or proprietary 3D rendering engines like Euclid offered by Amazon® of Seattle, Wash. That is, icons 214 are drawn to a UI element or view that can be manipulated like similar UI elements or views of the UI framework. In other embodiments, each of the icons may themselves comprise UI elements of the UI framework that are arranged in a layout container or "view group" of the UI framework. When the user and/or device move such that it is determined that the user has a new position or viewing angle with respect to the device, the icons 214 may be redrawn or rendered according to the new position or viewing angle. For example, if the user's relative position or viewing angle was originally perpendicular or substantially perpendicular to the display screen and the user tilts the device laterally to his right, the left faces of the objects of each icon may be seen more prominently, the textural shading and/or shadowing may change so as to appear as if a virtual light source has shifted to the left, the perspective of the objects may be skewed, the depth of field corresponding to the objects may be modified, among other possibilities. Such an approach may give a user an impression that he is interacting with the 3D icons 214 within a 3D environment.

Figure 3:
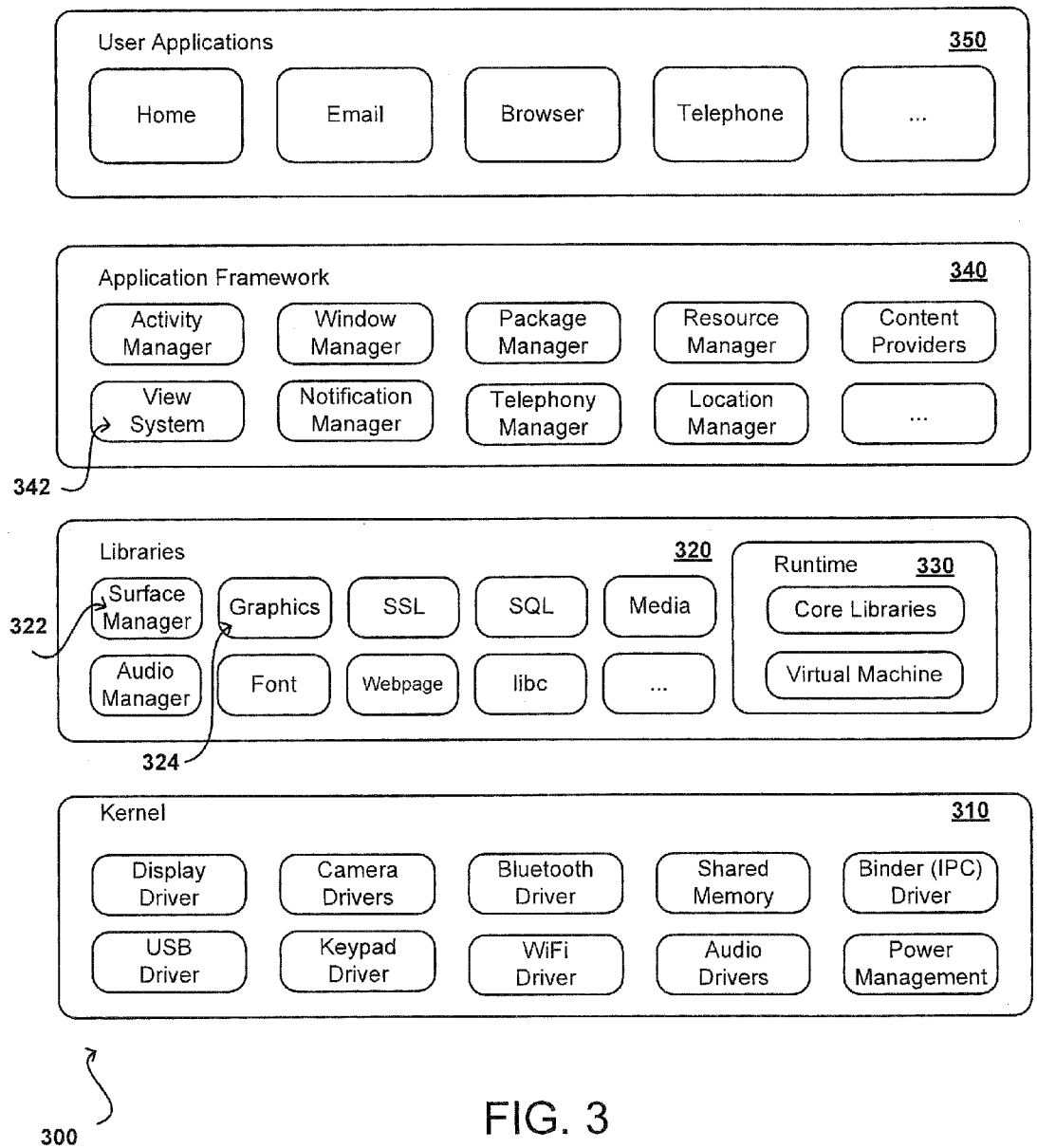
FIG. 3 illustrates an example of an operating system that can be used in accordance with an embodiment.

FIG. 3 illustrates an example operating system 300 for a computing device that can be used in accordance with various embodiments. Operating system 300 may be based on the open-source Android® platform (e.g., version 3.0 or later), but it will be appreciated that other platforms can be utilized in various embodiments, such as iOS®, Windows Phone®, Blackberry®, webOS®, among others. At the bottom of the software stack 300 resides the kernel 310, which provides a level of abstraction between the hardware of the device and the upper layers of the software stack. In an embodiment, the kernel 310 may be based on the open-source Linux® kernel. The kernel 310 may be responsible for providing low level system services such as the driver model, memory management, process management, power management, networking, security, support for shared libraries, logging, among others.

The next layer in the software stack 300 is the system libraries layer 320 which can provide support for functionality such as windowing (e.g., Surface Manager) 322, 2D and 3D graphics rendering 324, Secure Sockets Layer (SSL) communication. SQL database management, audio and video playback, font rendering, webpage rendering, System C libraries, among others. In an embodiment, system source libraries layer 320 can comprise open source libraries such as the Skia Graphics Library (SGL) (e.g., 2D graphics rendering), Open Graphics Library (OpenGL®) (e.g., 3D graphics rendering), Open SSL (e.g., SSL communication), SQLite (e.g., SQL database management), Free Type (e.g., font rendering), WebKit (e.g., webpage rendering), libc (e.g., System C libraries), among others. Thus, dependencies are established between higher levels of the software stack of operating system 300 and these system libraries. In particular, SGL and OpenSGL can be characterized as being built-in or inherent to the operating system 300.

Located on the same level as the system libraries layer is the runtime layer 330, which can include core libraries and the virtual machine engine. In an embodiment, the virtual machine engine may be based on Dalvik®. The virtual machine engine provides a multi-tasking execution environment that allows for multiple processes to execute concurrently. Each application running on the device is executed as an instance of a Dalvik® virtual machine. To execute within a Dalvik® virtual machine, application code is translated from Java® class files (.class, .jar) to Dalvik® bytecode (.dex). The core libraries provide for interoperability between Java® and the Dalvik® virtual machine, and expose the core APIs for Java®, including data structures, utilities, file access, network access, graphics, among others.

The application framework 340 comprises a set of services through which user applications interact. These services manage the basic functions of a computing device, such as resource management, voice call management, data sharing, among others. The Activity Manager controls the activity life cycle of user applications. The Package Manager enables user applications to determine information about other user applications currently installed on a device. The Window Manager is responsible for organizing contents of a display screen. The Resource Manager provides access to various types of resources utilized by user application, such as strings and user interface layouts. Content Providers allow user applications to publish and share data with other user applications. The View System 342 is an extensible set of UI elements or views used to create user interfaces for user applications. The Notification Manager allows for user applications to display alerts and notifications to end users. The Telephony Manager manages voice calls. The Location Manager provides for location management, such as by GPS or cellular network. Other hardware managers in the application framework 340 include the Bluetooth Manager, WiFi Manager, USB Manager, Sensor Manager, among others.

Located at the top of the software stack 300 are user applications, such as a home screen application, email application, web browser, telephony application, among others.

A view system (also sometimes referred to as a user interface framework), such as view system 342 of FIG. 3, can provide a manner for presenting data to a user (e.g., graphics, text, and audio) and the means for the user to interact with that data (e.g., key presses such as via a keyboard or buttons, virtual pointer gestures such as via a mouse or trackpad, physical pointer gestures such as via touch or a stylus, device motion gestures, facial movement or gestures, hand gestures, among others). In some embodiments, a UI framework or view system can be abstracted out as individual user interface elements or views in the example operating system 300 of FIG. 3. A UI element or view occupies a rectangular area of a display screen, and can be responsible for drawing and event handling. An example of a UI element or view can include a text field, image, button as well as UI elements containing such UI elements or views. UI elements or views may be arranged for display on the display screen by placing them within layout container views or view groups in the example operating system 300 of FIG. 3.

Figure 4:
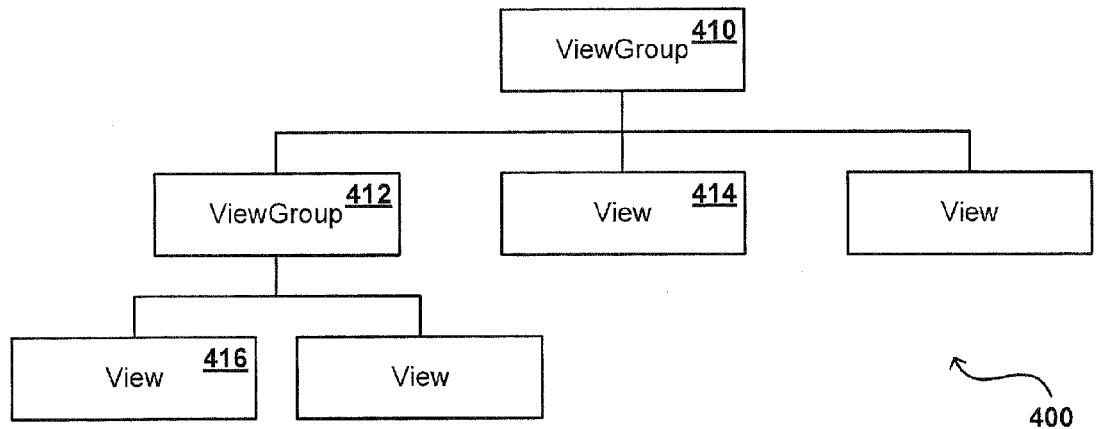
FIG. 4 illustrates example components of a user interface framework of an operating system, such as that illustrated in FIG. 3, that can be used in accordance with an embodiment.

FIG. 4 illustrates an example of a view hierarchy 400 for UI elements and layout containers (or views and view groups, respectively) that can be used in accordance with an embodiment. At the root of the UI element or view hierarchy 400, there may be a layout container or view group 410 that sets forth how its children are to be arranged for display. Examples of layouts can include frame layouts, linear layouts, relative positioning layouts, grid-based layouts, among others. Layout containers can include one or more child layout containers, such as layout container or view group 412 and one or more UI elements, such as view 414. Child layout containers can include one or more of their own child layout containers (not shown) and one or more of their own UI elements, such as view 416. In some embodiments, a layout can be defined declaratively in a language such as XML and/or programmatically in a language such as Java®. An advantage of such an approach can enable the "look" of an application to be designed without particularized knowledge of software programming.

Users may interact with a UI element or view, such as by clicking on, touching, or swiping the UI element or view, issuing an audio command, shaking a device, among other possibilities. These user interactions are sometimes referred to as "input events," and UI elements or views may be configured to monitor for specific input events via "event listeners." An event listener is an implementation of a UI element or view that contains a callback function. These functions will be invoked by the UI framework or view system for the UI element or view to which the listener has been implemented when triggered by a particular user interaction with the UI element or view. For instance, in the example 200 of FIG. 2, the UI element or view containing icons 214 may register a head-tracking-based event listener for tracking the user's position or viewing angle with respect to the computing device. As mentioned, in various embodiments, head or face tracking and/or device motion detection can be used to estimate the position of the user's head or face with respect to a computing device. Such input data can be captured using cameras, sensors such as accelerometers, gyroscopes, and magnetometers, and/or other input elements of a computing device as discussed elsewhere herein or incorporated by reference herein. A new relative position of the user (or related information such as the viewing angle of the user with respect to the computing device) can be determined by analyzing such input data, and the new relative position or viewing angle may be recognized as an input event that will trigger the head-tracked-based event listener's callback function. The callback function may cause the icons 214 to be redrawn or rendered according to the new relative position or viewing angle.

Figure 5:
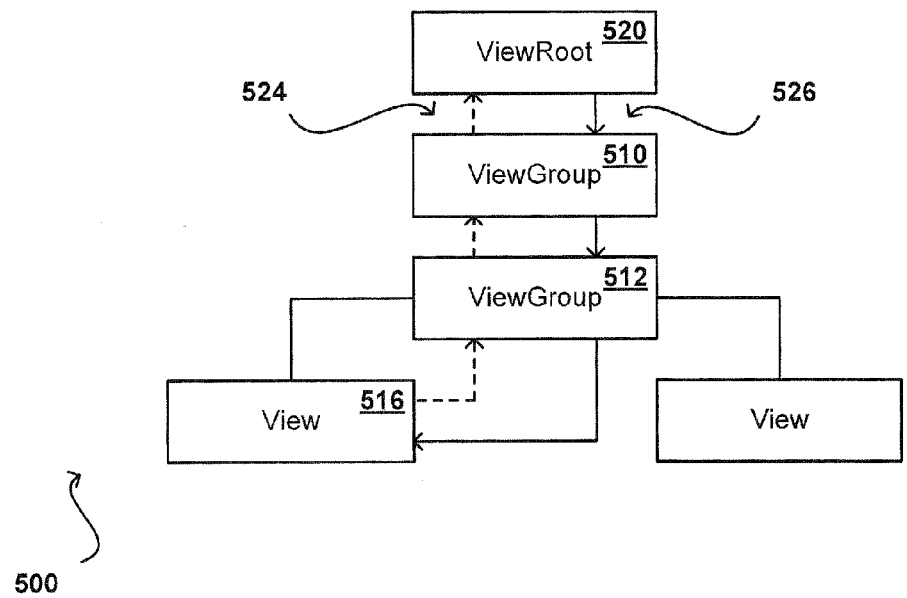
FIG. 5 illustrates an example process for maintaining states of user interface elements of a user interface framework, such as that illustrated in FIG. 4, that can be used in accordance with an embodiment.

When a UI element or view is drawn for the first time or needs to be redrawn or rendered in response to an input event, such as a new position or viewing angle of the user with respect to a computing device, the UI framework or view system first traverses the UI element or view hierarchy to measure and layout the UI elements or views according to the appropriate size and position of each UI element or view before drawing each UI element or view. FIG. 5 illustrates an example 500 of an implementation for this process that can be used in accordance with an embodiment. In the UI framework or view system, drawing can be initiated by a call to "invalidate" a UI element or view or mark the UI element or view as "dirty," such as in response to the input event. For instance, user interaction with a UI element or view may cause a change to the UI element or view. Pressing a virtual button may change the color of the button, cause the button to appear to be depressed, cause a menu or new window to be displayed, etc. As a result, the button may have to be redrawn or rendered. To the extent the button also causes a menu or new window to be displayed, the portion of the display screen where the menu or new window will be displayed also must be redrawn or rendered. In conventional approaches, the entire UI element or view may have to be redrawn or rendered even when only a limited portion of the UI element or view to change in response to user interaction. To optimize drawing of the UI elements, those portions of the UI element or view that need to be redrawn or rendered are "invalidated," marked as "dirty," or otherwise marked as requiring redrawing. In this example, UI element or view 516 has been invalidated or marked as requiring redrawing, which propagates the invalidation or marking message up the UI element or view hierarchy, as indicated by the dashed line, to determine the dirty regions, i.e., those regions of the screen that need to be redrawn. First, the invalidation or marking message is propagated from UI element or view 516 to its parent, layout container or view group 512; then to the parent of layout container or view group 512, layout container or view group 510; and finally to the root of the UI element or view hierarchy. UI root element or view root 520. In many instances, the UI root element or view root 520 encapsulates the penultimate layout container view group or UI element view but the UI root element or view root includes additional functions that are not implemented by a layout container or view group or a UI element or view. The UI root element or view root 520 then schedules traversals of all of the UI elements or views within the hierarchy to measure and layout the UI elements or views appropriately and draw those UI elements or views intersecting with the dirty regions, as indicated by the solid line.

A potential disadvantage with this approach is that the drawing traversal may result in the redrawing of a UI element or view that has not been changed. For example, a user application may invoke invalidate on a button that overlays a more complex UI element or view, such as a map UI element or view. Thus, the map UI element or view may be redrawn despite no changes occurring to the map UI element or view. For a computing device that supports hardware acceleration (e.g., via a GPU), drawing can be optimized by deferring drawing of each UI element or view and storing the draw commands as "display lists." A display list can be thought of as a cache, and a display list item is a cached instance of the output of a drawing command that can be retrieved without having to re-execute all of the code of the drawing command. Further, a display list item can be manipulated by operations such as translation, rotation, scale, skew, transparency change, among others, without first re-executing all of the code of the drawing command. By retrieving a drawing command output from a display list, less code may be executed in the aggregate. In addition, the UI framework or view system can record or update display lists that have been marked dirty, and a UI element or view that has not been invalidated can be retrieved by re-issuing the corresponding display list that was previously recorded. Thus, in at least some embodiments, updating of a user interface can include propagation of invalidation messages through the UI element or view hierarchy, recording and updating display lists, and drawing the display lists.

In some operating systems or platforms, there may be multiple approaches for drawing or rendering graphics for user interface elements. For instance, the example operating system 300 of FIG. 3 may enable user applications 350 to employ standard or default components (e.g., text view, button view, image view) that handle drawing of UI elements or views without additional processing. In many situations, however, a user may desire customized drawing of UI elements. Various approaches can be implemented for such customized rendering within the example operating system 300 of FIG. 3, including 2D or 3D software-based rendering or GPU-based rendering within the example operating system, or "native" rendering based on existing applications written in native code or which use native libraries. That is, the example operating system 300 provides support for third party applications, libraries, or systems written in native code, such as C or C++. However, the conventional approach implemented by the operating system 300 for native rendering does not include support for the user interface framework or view system 342 of the example operating system. For example, the UI framework or view system is effectively disabled or otherwise unused during execution of a native application, and the native application uses a full screen for rendering content without the layout, measurement, optimizations, and other functionality provided by the UI framework or view system.

Figure 6:
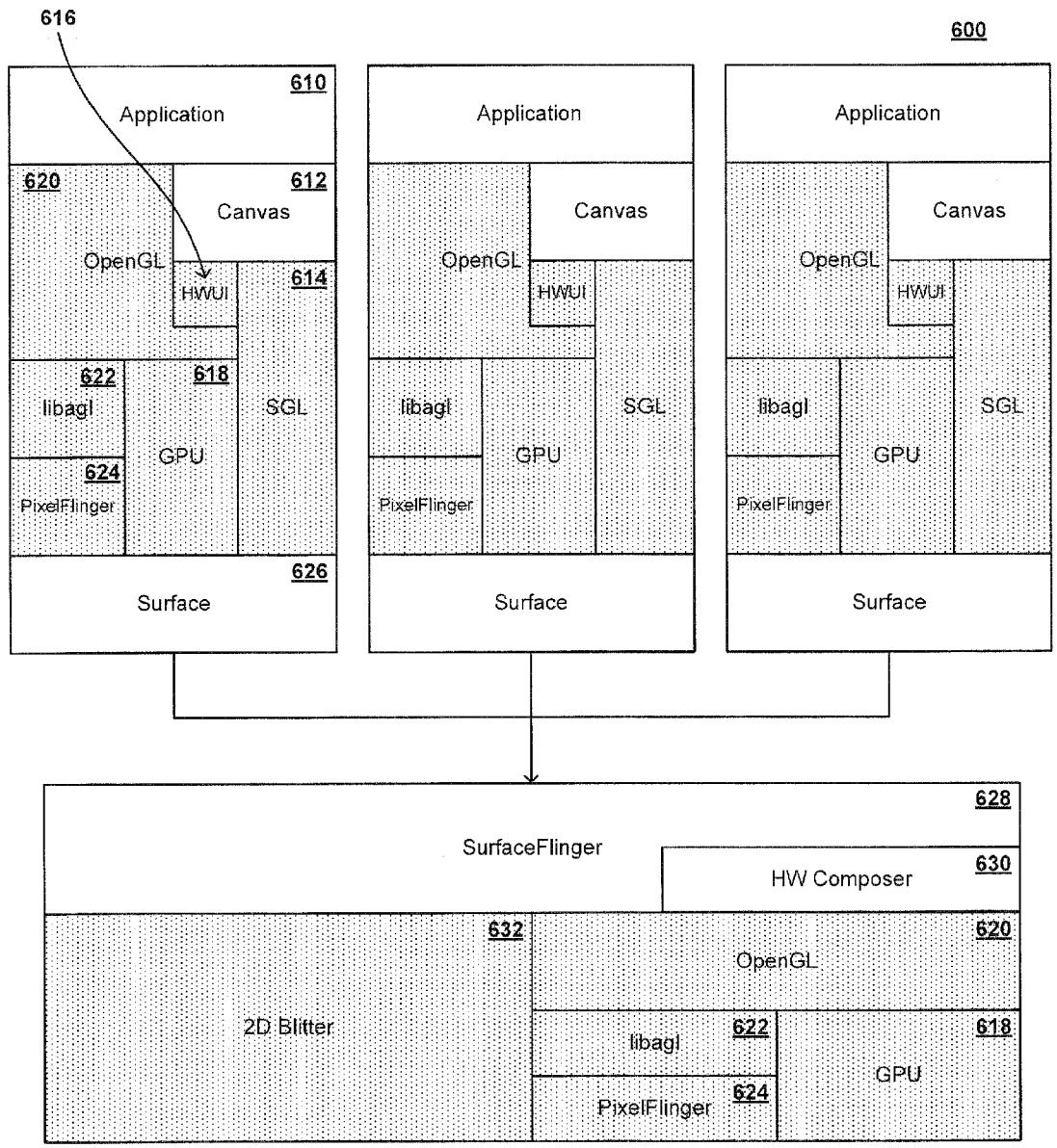
FIG. 6 illustrates a conventional graphics subsystem for an operating system, such as that illustrated in FIG. 3.

FIG. 6 illustrates a conventional graphics subsystem 600 for the operating system 300 of FIG. 3 showing how graphics can be rendered for a user application and composited for multiple user applications. User applications 610 may correspond to the user applications 350 of FIG. 3, the graphics subsystem (shaded in light gray) may correspond to the graphics libraries 324 of FIG. 3, and the compositor, i.e., Surface Flinger 634, may correspond to the Surface Manager 322 of FIG. 3. A canvas, such as canvas 612, is a 2D drawing context for rendering UI elements or views, such as UI elements or views 414 or 416 of FIG. 4. Drawing to a canvas can be software-based using SGL 614 or hardware-accelerated using HWUI 616. SGL 614 is a 2D drawing API that performs rendering in software. The HWUI library 616 enables rendering of 2D user interface elements to be accelerated using a GPU 618 by leveraging the OpenGL® library 620. Three-dimensional rendering can also be performed exclusively in software or be GPU-accelerated. In the software-based approach, the libagl library 622 is used for implementing OpenGL ES® 1.x, and libagl utilizes PixelFlinger 624 for calling OpenGL®.

A surface 626 corresponds to an off-screen buffer into which a user application 610 renders content. For example, an application might draw 2D objects into the surface using SGL 614 or 2D rendering of GPU-accelerated UI elements using the HWUI library 616. Surface manager or Surface Flinger 628 handles surface composition or effects such as fading or page-flipping for one or more surfaces, such as surface 626, of multiple user applications, such as user application 610. Although this example shows that each user application corresponds to only one surface, it will be appreciated that in other embodiments, user applications may correspond to multiple surfaces. Surface Flinger 628 determines what will be presented on a display screen when multiple surfaces are being rendered and performs overlays, inter-surface animations or effects, among other possibilities. Surface Flinger uses HW composer 630, a hardware abstraction layer (HAL), to perform composition using hardware resources like a 3D GPU or a 2D graphics engine. The 2D Blitter 632 is another hardware abstraction layer enabling the use of special hardware to speed up graphics operations like "blitting" or bit level block transfer for accelerating software rendering on systems without 3D GPUs. In performing surface compositioning, Surface Flinger 628 may also use the same libraries and other resources that a surface 626 may use, such as SGL 614, OpenGL® 620, libagl 622, PixelFlinger 624, GPU 618, among others.

The conventional graphics subsystem 600 provides limited approaches for 3D rendering of elements of the view system 342 of operating system 300 of FIG. 3, including surface views, texture views, RenderScript, and OpenGL® wrapper functions. Surface views are embedded within the view hierarchy but use a separate drawing surface than the rest of the view hierarchy and run on a thread separate from the main UI thread. When a surface view is instantiated, a secondary window is created at the location of the parent view and the surface view "punches a hole" in the parent view by causing the parent view to be displayed transparently. This approach enables video or OpenGL® content to be presented in the secondary window of the surface view, but it is difficult to manipulate the window of the surface view itself, such as performing animations or transformations like other views. For example, other UI elements or views can be rotated, scaled, or translated, or faded while it may be difficult and/or inefficient to perform such transformations for surface views. In some embodiments, a typical UI element or view can be bound by a 2D rectangle or x-y plane that can be rotated 360° around the z-axis of the rectangle. The typical UI element or view can also be scaled or increased or decreased in size while the relative proportions of the UI element or view remain the same. The typical UI element or view can also be translated or moved to a new x-y position. The typical UI element or view can also be faded or have a transparency effect applied such that the UI element or view can appear translucent or opaque. Similar to surface views, a texture view enables a content stream, e.g., video or an OpenGL® scene, to be displayed in the window of the texture view and the texture view runs on a separate thread from the main UI thread. A texture view is also similar to a surface view in that the contents of the texture view are rendered in a different context from the UI element or view hierarchy. In particular, a different OpenGL® thread or video thread is streamed inside a texture view. Unlike a surface view, however, a texture view does not create a separate window and behaves like a regular UI element or view in that the texture view can be animated, transformed, scrolled, among other possibilities. Further, texture views require a GPU-accelerated device.

RenderScript is a language (based on C99), API, and runtime library that can be used for rendering user interface components. RenderScript can be implemented at the application framework level 340 of FIG. 3 and includes additional components written using the RenderScript language. These scripts are initialized from the virtual machine of the runtime library 330. RenderScript has a reference to a drawing surface that it renders to in a thread that is separate from the main UI thread. The example architecture 300 of FIG. 3 also provides for OpenGL® wrapper functions that call the underlying OpenGL® APIs from within views. The wrapper functions are provided for legacy support, and are not intended for current use.

There may be certain disadvantages with each of the conventional approaches for enabling 3D rendering of the UI elements of the UI framework or view system. First, all of the approaches are limited to the built-in OpenGL® rendering library. Users may prefer to use a rendering engine that is independent of the operating system 300 of FIG. 3, such as OGRE 3D, Irrlicht, OpenSceneGraph, Euclid, among others. Such engines may offer a richer feature set than OpenGL®. For example, OGRE 3D (e.g., version 1.8 or later) provides fixed function operations such as multi-texture and multi-pass blending, texture coordinate generation and modification, independent color and alpha operations; mesh features such as flexible mesh data formats, Biquadric Bezier patches for curved surfaces, progressive meshes, and static geometry batching; skeletal animation, including multiple animation blending with variable weights, variable/multiple bone weight skinning, manual bone control, and configurable interpolation modes; flexible animation support, including morph animation or pose animation; animate of scene nodes, including spline interpolation when necessary; scene features, including a hierarchical scene graph, multiple shadow rendering techniques in both modulative and additive approaches, stencil and texture based, and scene querying; special effects such as full-screen post-processing, particle systems, skyboxes, skyplanes, skydomes, biliboarding for sprite graphics; ribbon trails; among others. Drawing or rendering performance of UI elements may also be better in certain use cases using an independent renderer rather than the built-in or inherent OpenGL® rendering library.

Further, surface views, texture views, and RenderScript each render on a separate thread from the main UI thread and rendered content is drawn onto surfaces separate from the view hierarchy. As a result, the OpenGL® context is separate from the view hierarchy surface in these conventional approaches, and it may be difficult and/or inefficient to manipulate these views like other UI elements or views in the UI framework or view system 342 of FIG. 3. For example, operations such as rotate, translate, scale or setting transparency are not readily available for surface views because surface views are outside of the view hierarchy, and composition order is not preserved. Although texture views allow for the window containing OpenGL® content to be manipulated by the view system (e.g., composition order is preserved), the actual surface of a texture is streamed from a separate thread and thus the contents of a texture view are indirectly drawn to the UI framework or view system such that performance may be hindered.

Figure 7:
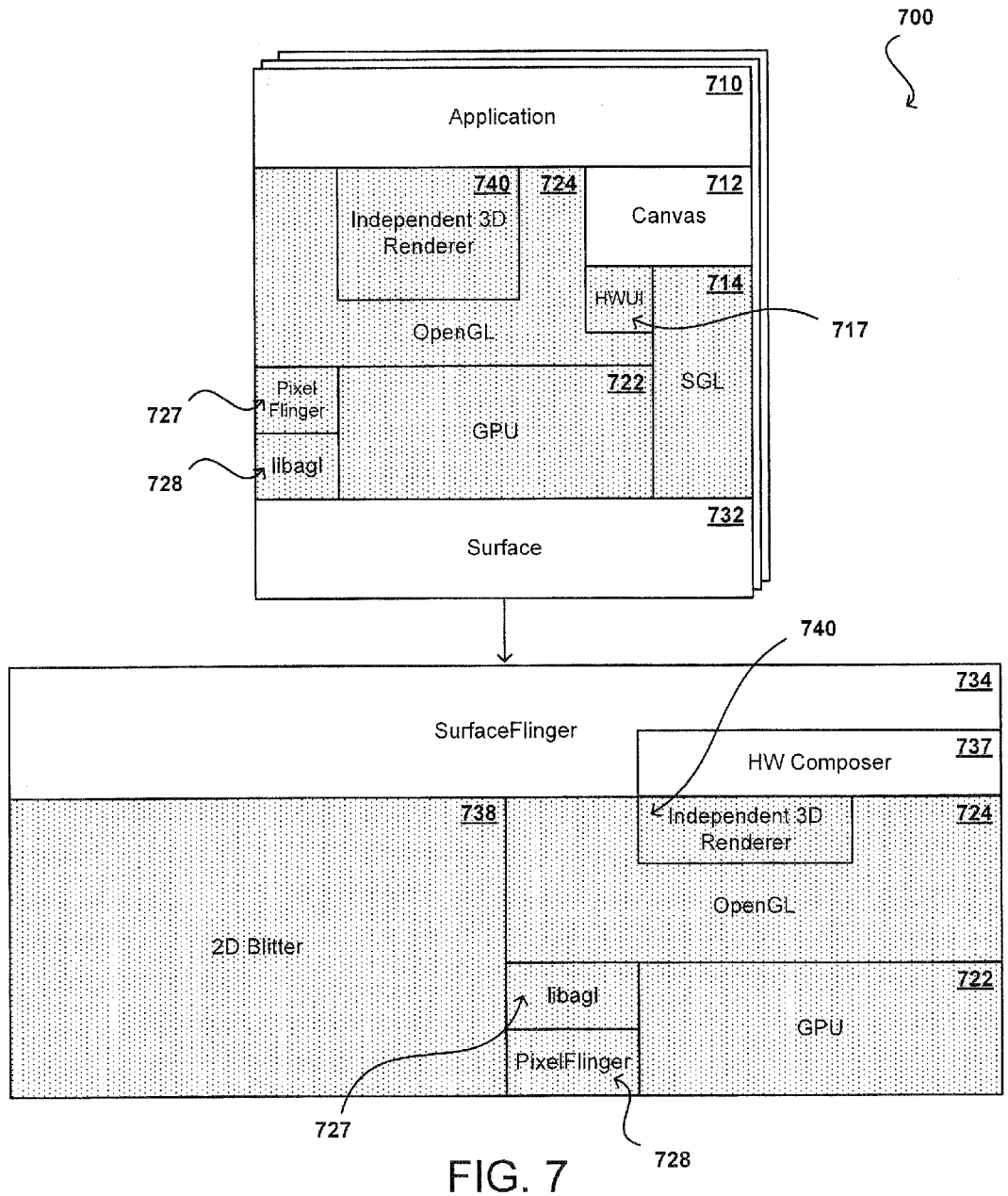
FIG. 7 illustrates a graphics subsystem for an operating system, such as that illustrated in FIG. 3, that can be used in accordance with an embodiment.

Approaches in accordance with various embodiments integrate a 3D rendering engine that is independent of the operating system 300 of FIG. 3 (e.g., a 3D rendering library other than OpenGL®) with the user interface framework or view system 342. That is, a UI element or view can be configured to utilize an independent 3D renderer for drawing the contents of the UI element or view while still being capable of being laid out, measured, and/or otherwise manipulated like other elements of the UI framework or view system. FIG. 7 illustrates an example graphics architecture 700 that can be used in accordance with an embodiment. Built-in graphics libraries, such as SGL 714 and OpenGL® 724, remain available to user applications 710. However, an independent 3D rendering engine 740 is also exposed to the UI framework or view system for those user applications that wish to render 3D content using an independent renderer. The independent 3D renderer can include OGRE 3D, Irrlicht, OpenSceneGraph, Euclid, among others.

In the example of FIG. 7, the independent renderer 740 can express its content as OpenGL® format in order for Surface Flinger 734 to composite the content drawn by independent renderer with other views that may draw using SGL or OpenGL®. In another embodiment, the independent renderer can be utilized for compositing each surface to be displayed for a computing device. For example, a first user application may generate a first UI element or view that contains one or more first 3D graphical elements rendered using the independent renderer. A second user application may generate a second UI element or view that contains one or more second graphical elements rendered using the built-in or inherent 2D graphics library that is software-based (e.g., SGL), the built-in or inherent 2D graphics library that is GPU-accelerated (e.g., OpenGL®), or the built-in or inherent 3D graphics library (e.g., OpenGL®). To display both UI elements or views simultaneously, such as both the UI elements or views being fully displayed in separate portions of the display screen or the first UI element or view stacked on top of the second UI element or view (or vice versa), the UI elements or views may be composited using the independent rendering engine. In this manner, at least a portion of both UI elements or views can be displayed concurrently, and at least a portion of one or more of the first 3D graphical elements and at least a portion of one or more of the second graphical elements (2D or 3D) may be displayed on the display screen at the same time. It will be appreciated that the independent renderer can be used to composite multiple UI elements or views including multiple 3D graphical elements rendered by the independent renderer and/or multiple UI elements or views including multiple graphical elements rendered by the built-in or inherent 2D or 3D renderers of the example operating system of FIG. 3 (e.g., SGL or OpenGL®).

Returning to the example of FIG. 7, it can be also seen that independent rendering engine 740 supports hardware-acceleration (e.g., via the GPU). In some embodiments, an independent renderer may be written in a native language, such as C (or one of its variants, including K&R C, C89, C90, C11, or Embedded C), C++, or Objective-C, among others, and can be ported to the operating system 300 of FIG. 3 using compilers, linkers, etc. (e.g., provided by a native development kit (NDK)). Wrapper classes or functions can be used to encapsulate the application programming interface (API) of the native and independent rendering library, which can then be invoked by the UI element or view hierarchy for 3D rendering by the independent renderer. An interface, such as Java Native Interface (JNI), can be used to enable UI elements, which may be written in Java®, to be able to invoke the functionality of the independent renderer, which may be written in a language other than Java®, such as C or a variation thereof. In another embodiment, the independent renderer can be written in a software programming language directly supported by an operating system, such as Java® for the operating system 300 of FIG. 3.

In some embodiments, a "model view" can be created for 3D rendering by the independent rendering engine 740. The model view can be rotated, scaled, translated or otherwise transformed like other UI elements or views of the UI framework or view system. Similar to other UI elements or views, the model view can also register event listeners, such as a head tracking-based event listener to enable user interaction with the model view. The model view may also implement the same invalidate and draw traversals used by other UI elements or views, such as when a head-tracking event indicates that the user's viewing angle has changed and the contents of the model view need to be redrawn or rendered to correspond to the new viewing angle. However, unlike conventional approaches, in at least some embodiments, rendering of 3D content by the 3D renderer can occur during the traversal of the display list, and the 3D rendering context can be shared with the surface to which the UI element or view hierarchy will be drawn. The wrapper classes or functions corresponding to the independent renderer 740 can be instantiated in the UI framework or view system, and model views may retrieve pointers to the underlying API of the independent renderer. During the display list traversal, the pointers to the underlying API of the independent rendering engine may be invoked to draw 3D content of the model view. As a consequence, 3D rendering can occur at view composition time, and composition order may be preserved. In addition, in some embodiments, the 3D rendering context and UI element or view hierarchy surface can be shared. Processing for the independent renderer and the UI element or view hierarchy can be performed on the same thread such that 3D content can be written directly to the UI element or view hierarchy surface rather than streamed such as in the approach of the texture view. This can improve performance by reducing the amount of memory allocations and eschew inter-process communications that may be performed by conventional approaches.

Figure 8:
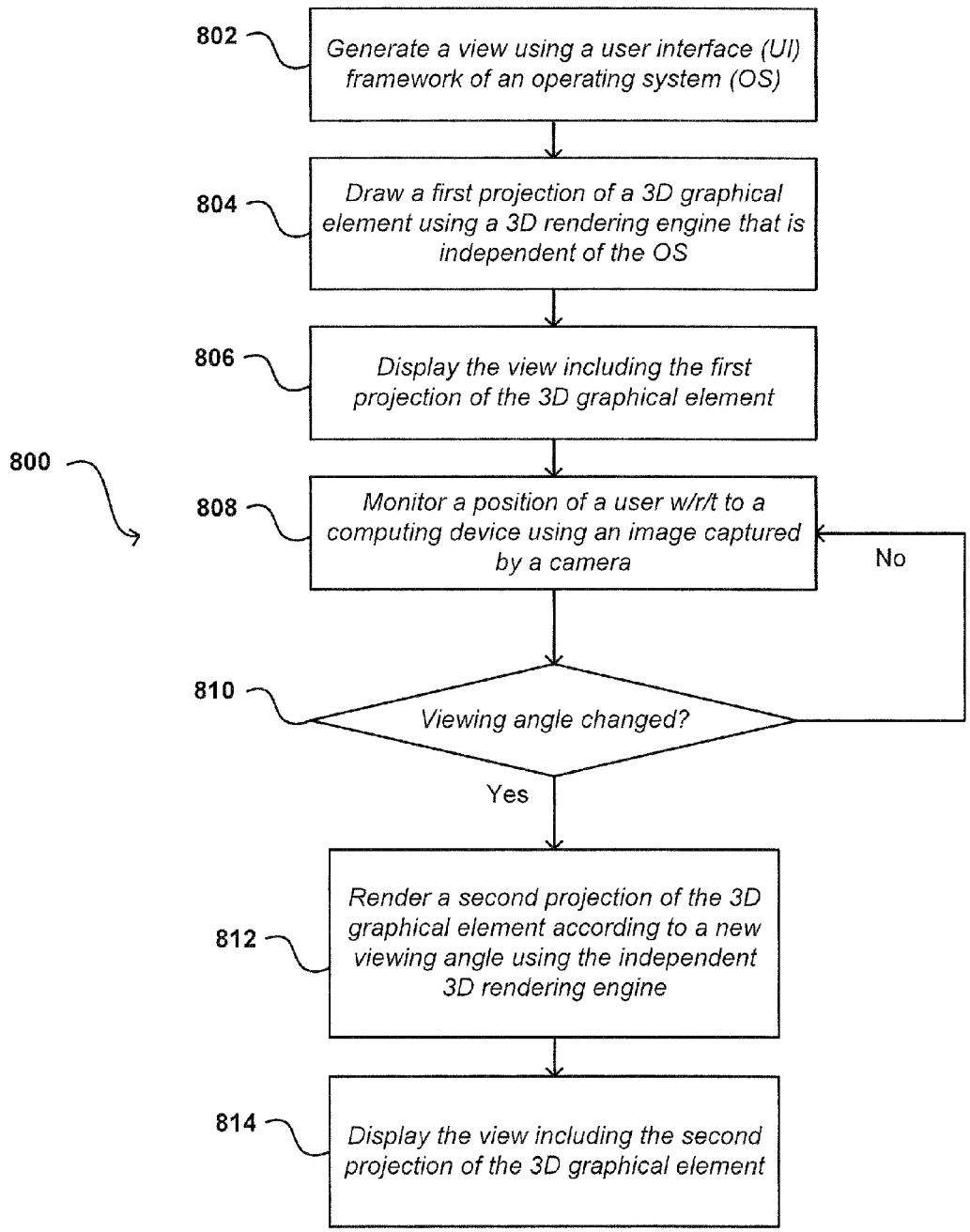
FIG. 8 illustrates an example process for providing a user interface that is based on tracking of a head or face of a user in accordance with an embodiment.

FIG. 8 illustrates an example process 800 for providing a user interface based on tracking of a user's head or face in accordance with an embodiment. It should be understood that, for any process discussed herein, there can be additional, fewer, or alternative steps performed in similar or alternative orders, or in parallel, within the scope of the various embodiments unless otherwise stated. The process may be initiated by powering on a computing device such as if the process is performed as part of a home screen application. In other embodiments, a user interface based on head or face tracking may be part of a user application, and the process can be initiated by starting up the user application. The process may begin by generating a UI element or view using a UI framework of a specified operating system 802, such as the UI framework or view system 342 of example operating system 300 of FIG. 3. In this example, the UI element can be manipulated like any other UI element of the UI framework, including being transformed according to a rotation, scale, translation, or transparency effect. This is in contrast to an approach such as rendering to a low-level frame buffer that is not integrated with the UI framework. The UI element or view can include one or more 3D graphical elements drawn using a rendering engine that is independent of the specified operating system 804. That is, the contents of the UI element or view are drawn by the independent 3D renderer rather than via the built-in 3D graphics library of the operating system (e.g., OpenGL® or variations thereof, or Direct3D® or variations thereof). For example, projections of the 3D graphical elements can be generated by the independent renderer (e.g., OGRE 3D, Irrlicht Engine, OpenSceneGraph, Euclid, among others) for presentation on a 2D display screen according to a default projection or a first projection upon the device powering on or a user application starting up. In some embodiments, the initial contents of the UI element or view can include bitmaps corresponding to first or default projections of the 3D graphical elements that are loaded from memory instead of drawn by the independent renderer. Such an approach can optimize initialization of the home screen application or other user application as the initial display or manner of presentation of the graphical elements comprises retrieving bitmaps. As mentioned, wrapper classes and functions can be used to encapsulate the API of the independent renderer such that the API of the independent renderer can be executed within the UI framework or view system of the specified operating system. For example, the wrapper classes or functions can map to pointers to the functions of the independent rendering engine, and these wrapper classes and functions can be invoked by UI elements for customized rendering. In at least some embodiments, interoperability technology such as JNI, can be used by the UI framework to call the API of the independent 3D rendering engine. Whether retrieved as bitmaps or drawn using the independent 3D renderer, the graphical elements can be displayed in the UI element or view 806.

The position of the user can be monitored 808, and the movement of the user and/or movement of the device meeting predetermined thresholds can be recognized as input events for the UI framework or view system. For instance, the range of head motion for an average adult male includes a forward to backward movement of the neck from −60.4° to 69.6°, a right to left bending of the neck from −40.9° to 36.3°, and a right to left rotation of the head from −79.8° to 75.3°. A movement of the user's head up to a certain threshold, such as 0.1° for precise applications or 10.0° for less precise use cases, can trigger an event listener's callback function. In other embodiments, movement of the user's head can be measured as displacements or as a combination of a rotation and a translation.

In some embodiments, the position of the user's head can be estimated based on where the representation of the user's head is detected in images captured by one or more cameras. Depending on the application, the relative position of the user can be represented in various ways. In certain embodiments, the relative position can be represented as the raw pixel coordinates of the representation of the user's head detected in the captured image(s). In other embodiments, the relative position of can be computed with respect to the computing device. For example, in one embodiment, a three-dimensional vector can be defined between a first point corresponding to the computing device, such as the center of a display screen of the device, and a second point corresponding to the user's head, such as a point between the user's eyes. Determining the relative position user can include computing the values of this vector as the user's head, face, and/or eyes move with respect to the device (or the device is moved with respect to the user).

In still other embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, or the algorithm set forth in Zhang, Zhengyou. "A flexible new technique for camera calibration." *Pattern Analysis and Machine Intelligence, IEEE Transactions on* 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images involves feature matching, which is discussed elsewhere herein or incorporated elsewhere herein. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction.

One of ordinary skill in the art will appreciate that other embodiments may reconstruct 3D points from multiple 2D images, such as approaches based on calculating the trifocal tensor for three images or techniques based on the factorization algorithm or bundle adjustment for n images. These various approaches for reconstruction are discussed in Hartley, Richard et al. *Multiple view geometry in computer vision*. Vol. 2. Cambridge, 2000, which is hereby incorporated herein by reference.

Alternatively, or in addition, other sensors, such as accelerometers, gyroscopes, magnetometers, or some combination thereof, can also be used to estimate a user's position relative to a computing device. For example, when only motion/orientation sensors are used, it may be assumed that the absolute position of the user's head remains the same or substantially the same when the device is moved or its orientation changed. The motion and/or orientation of the device can be determined from the motion/orientation sensors, and the relative position of the user can be estimated from the data captured by the motion/orientation sensors based on the assumption that the user's absolute position remains the same. In other embodiments, image analysis techniques can be combined with approaches using motion/orientation sensors. The relative position of the user with respect to the device or additional analysis of the user's position, such as determining a viewing angle of the user with respect to the device, can be used as an input event by the UI framework or view system. The UI element or view can register a head-tracking-based event listener to monitor such input events.

As mentioned, upon initial display, the 3D graphical elements can include a first manner of presentation, such as being displayed according to a first perspective projection, rotation, scale, translation, among other transformations, corresponding to a user viewing angle that is perpendicular or substantially perpendicular relative to the screen. In some embodiments, the 3D graphical elements can also include a first set of textural shading, a first set of shadows, and/or a first set of reflections. A manner of presentation for a 3D object can therefore include a particular set of textural shading, a set of shadows, a set of reflections, a rotation, a scale, a translation, a perspective projection, etc., for the 3D object at a specified relative position or viewing angle of the user. When the user's relative position or viewing angle is determined to have changed 810, the 3D graphical elements can be redrawn or rendered according to the new relative position and/or viewing angle of the user with respect to the computing device. Thus, a second perspective projection, rotation, scale, translation, set of textural shades, set of shadows, set of reflections, etc., for the 3D graphical elements can be generated based on the new relative position and/or viewing angle of the user 812. The rendering can be performed using the independent 3D rendering engine, and the UI element or view including the redrawn or rendered 3D graphical elements can be displayed 814 to give the user the impression that he is interacting with the 3D graphical elements in a 3D environment.

Figure 9:
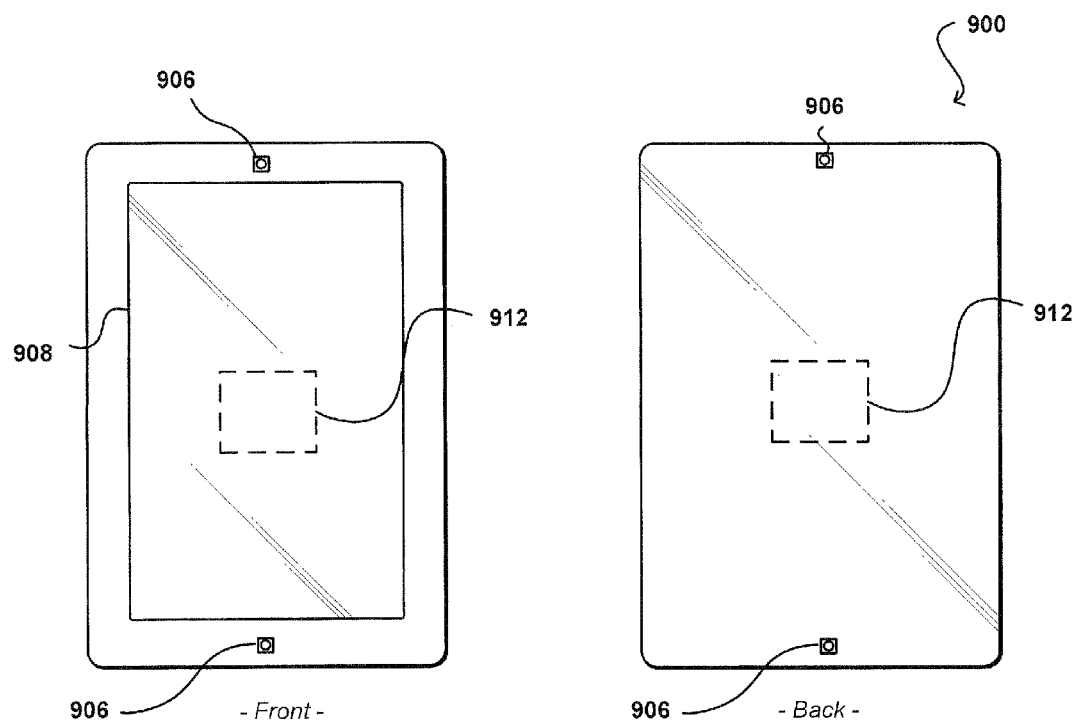
FIG. 9 illustrates an example of a computing device that can be used in accordance with various embodiments.
Figure 10:
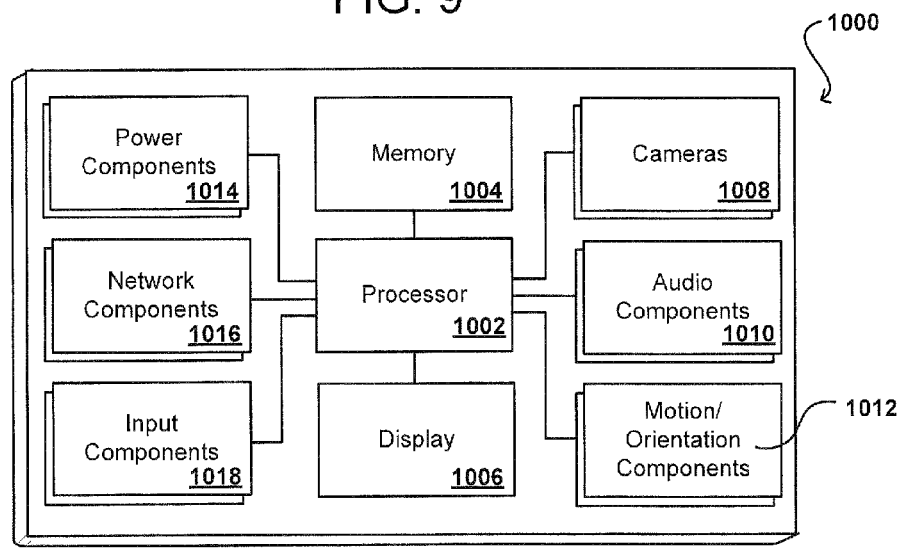
FIG. 10 illustrates an example configuration of components of a computing device such as that illustrated in FIG. 9.

FIG. 9 illustrates an example computing device 900 that can be used to perform approaches described in accordance with various embodiments. In this example, the device includes two cameras 906 located at the top and bottom on each of a same and opposite side of the device as a display element 908, and enabling the device to capture images in accordance with various embodiments. The computing device also includes an inertial measurement unit (IMU) 912, comprising a three-axis gyroscope, three-axis accelerometer, and magnetometer that can be used to detect the motion and/or orientation of the device, and to facilitate head or face tracking in accordance with various embodiments.

FIG. 1000 illustrates a logical arrangement of a set of general components of an example computing device 1000 such as the device 900 described with respect to FIG. 9. In this example, the device includes a processor 1002 for executing instructions that can be stored in a memory component 1004. As would be apparent to one of ordinary skill in the art, the memory component can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1008, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 1006 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 1000 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 1014 known in the art for providing power to a computing device, which can include capacitive charging elements for use with a power pad or similar device. The computing device can include one or more communication elements or networking sub-systems 1016, such as a Wi-Fi, Bluetooth, RF, wired, or wireless communication system. The device in many embodiments can communicate with a network, such as the Internet, and may be able to communicate with other such devices. In some embodiments the device can include at least one additional input element 1018 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 1000 also can include one or more orientation and/or motion sensors 1012. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1002, whereby the device can perform any of a number of actions described or suggested herein.

In some embodiments, the device 1000 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 1000 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 1000 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
one or more processors;
a display screen;
memory including instructions that, when executed by the one or more processors, cause the computing device to:
render a first projection of a first three-dimensional (3D) graphical element using an independent 3D rendering library, the independent 3D rendering library being separate from an inherent 3D rendering library of an operating system executing on the computing device;
display, on the display screen, the first projection of the first 3D graphical element within a first user interface (UI) element that can be configured by a UI framework of the operating system, the first UI element included in a layout container of the UI framework;
estimate a position of a user with respect to the computing device;
render a second projection of the first 3D graphical element based at least in part upon the position of the user with respect to the computing device, the second projection rendered using the independent 3D rendering library;
display, on the display screen, the second projection of the first 3D graphical element within the first UI element; and
display, on the display screen, a second graphical element within a second UI element, the second graphical element rendered by a rendering library other than the independent 3D rendering library, the second UI element included in the layout container.

2. The computing device of claim 1, wherein the first UI element can be configured by the UI framework according to at least one of a rotation, a scale, a translation, or a transparency effect.

3. The computing device of claim 1, wherein the instructions when executed further cause the computing device to:
generate the second UI element that can be configured by the UI framework, the second UI element including the second graphical element, the second graphical element rendered using an inherent 2D rendering library or the inherent 3D rendering library of the operating system;
generate a composition of the first UI element and the second UI element using the independent 3D rendering library, the composition including at least a portion of the first 3D graphical element and at least a portion of the second graphical element; and
display, on the display screen, the composition of the first UI element and the second UI element.

4. The computing device of claim 1, wherein the first projection of the first 3D graphical element includes at least one of a first set of textural shades, a first set of shadows, or a first set of reflections and the second projection of the first 3D graphical element includes at least one of a second set of textural shades, a second set of shadows, or a second set of reflections, the second projection or the at least one of the second set of textural shades, the second set of shadows, or the second set of reflections being rendered based at least in part upon the position of the user with respect to the computing device.

5. A computer-implemented method for displaying content, comprising:
   displaying a first UI element that can be configured by a UI framework, the first UI element including a first 3D graphical element displayed according to a first manner of presentation, the first UI element included in a layout container of the UI framework;
   obtaining information relating to a position of a user;
   generating a second manner of presentation for the first 3D graphical element based at least in part upon the information relating to the position of the user, the second manner of presentation for the first 3D graphical element generated at least in part by using an independent rendering component;
   displaying the first UI element including the first 3D graphical element according to the second manner of presentation; and
   displaying a second UI element including a second graphical element generated by a rendering component other than the independent rendering component, the second UI element included in the layout container.

6. The computer-implemented method of claim 5, wherein the first UI element can be configured by the UI framework according to at least one of a rotation, a scale, a translation, or a transparency effect.

7. The computer-implemented method of claim 5, wherein obtaining the information relating to the position of the user includes:
   obtaining an image including at least a portion of a representation of a face of the user;
   determining the position of the at least the portion of the representation of the face of the user in the image; and
   estimating a relative position of the user based at least in part upon the position of the at least the portion of the representation of the face of the user in the image.

8. The computer-implemented method of claim 5, wherein obtaining the information relating to the position of the user includes:
   obtaining at least one of motion data or orientation data from at least one of an accelerometer, a gyroscope, or a magnetometer;
   estimating a relative position of the user based at least in part upon the at least one of the motion data or the orientation data.

9. The computer-implemented method of claim 5, wherein the first manner of presentation includes at least one of a first perspective projection, a first rotation, a first scale, a first translation, a first set of textural shades, a first set of shadows, or a first set of reflections for the first 3D graphical element, and the second manner of presentation includes at least one of a second perspective projection, a second scale, a second translation, a second set of textural shades, a second set of shadows, or a second set of reflections for the first 3D graphical element, the at least one of the second perspective projection, the second scale, the second translation, the second set of textural shades, the second set of shadows, or the second set of reflections for the first 3D graphical element being generated using the independent library.

10. The computer-implemented method of claim 5, wherein generating the second manner of presentation for the first 3D graphical element includes:
   invoking a pointer to a function of the independent rendering component to render the first 3D graphical element to one or more buffers that are shared with a UI hierarchy corresponding to the first UI element.

11. The computer-implemented method of claim 5, further comprising:
   generating the second UI element that can be configured by the UI framework, the second UI element including the second graphical element;
   generating a composition of the first UI element and the second UI element using the independent rendering component, the composition including at least a portion of the first 3D graphical element and at least a portion of the graphical element; and
   display the composition of the first UI element and the second UI element.

12. The computer-implemented method of claim 11, wherein the second graphical element is rendered using at least one of an inherent 2D rendering component or an inherent 3D rendering component.

13. The computer-implemented method of claim 5, wherein generating the second manner of presentation for the first 3D graphical element based at least in part upon the information relating to the position of the user includes:
   marking the first UI element as requiring redrawing according to a perspective of the user corresponding to the information relating to the position of the user;
   traversing a UI hierarchy including the first UI element and marking one or more elements of the UI hierarchy requiring redrawing; and
   rendering the one or more elements of the UI hierarchy that have been marked as requiring redrawing,
   wherein rendering of the first UI element includes rendering of the first 3D graphical element using the independent rendering component.

14. The computer-implemented method of claim 13, further comprising:
   for each element of the one or more elements of the UI hierarchy,
      storing a display list for the element;
      generating an updated display list for the element if the element has been marked as requiring redrawing; and
      rendering the element from the display list if the element has not been marked as requiring redrawing,
   wherein rendering the one or more elements of the UI hierarchy that have been marked as requiring redrawing includes rendering the element from the updated display list.

15. The computer-implemented method of claim 5, wherein at least a portion of the second manner of presentation for the graphical element is generated at least in part by a graphics processing unit (GPU).

16. The computer-implemented method of claim 5, wherein at least a portion of processing for the UI framework and at least a portion of processing by the independent rendering component are performed on a same thread.

17. A non-transitory computer-readable storage medium storing instructions for displaying content, the instructions when executed by one or more processors of a computing device causing the computing device to:
   display a UI element that can be configured by a UI framework, the UI element including a 3D graphical element according to a first manner of presentation, the first UI element included in a layout container of the UI framework;
   obtain information relating to a position of a user;
   generate a second manner of presentation for the 3D graphical element based at least in part upon the information relating to the position of the user, the second manner of presentation for the 3D graphical element generated at least in part by using an independent rendering component;

display the UI element including the 3D graphical element according to the second manner of presentation; and displaying a second UI element including a second graphical element generated by a rendering component other than the independent rendering component, the second UI element included in the layout container.

18. The non-transitory computer-readable storage medium of claim 17, wherein the instructions when executed further cause the computing device to:

mark the UI element as requiring redrawing according to a perspective of the user corresponding to the information relating to the position of the user;

traverse a UI hierarchy including the UI element and marking one or more elements of the UI hierarchy requiring redrawing; and rendering the one or more elements of the UI hierarchy that have been marked as requiring redrawing, wherein the instructions when executed to cause the computing device to render the UI element includes causing the computing device to render the 3D graphical element using the independent rendering component.

19. The non-transitory computer-readable storage medium of claim 18, wherein the instructions when executed further cause the computing device to:

for each element of the one or more elements of the UI hierarchy, store a display list for the element;

generate an updated display list for the element if the element has been marked as requiring redrawing; and render the element from the display list if the element has not been marked as requiring redrawing, wherein the instructions when executed to cause the computing device to render the one or more elements of the UI hierarchy that have been marked as requiring redrawing include causing the computing device to render the element from the updated display list.

20. The non-transitory computer-readable storage medium of claim 17, wherein the instructions when executed to cause the computing device to generate the second manner of presentation for the 3D graphical element include causing the computing device to:

invoke a pointer to a function of the independent rendering component to render to one or more buffers that are shared with a UI hierarchy corresponding to the 3D graphical element.

* * * * *